United States Patent [19]

Horie

[11] Patent Number: 5,142,519
[45] Date of Patent: Aug. 25, 1992

[54] OPTICAL RECORDING MEDIUM AND DEVICE FOR WRITING AND READING INFORMATION IN AND FROM THE RECORDING MEDIUM

[75] Inventor: Kiyoshi Horie, Kanagawa, Japan

[73] Assignee: Kabushiki Kaisha CSK, Tokyo, Japan

[21] Appl. No.: 555,476

[22] PCT Filed: Dec. 15, 1989

[86] PCT No.: PCT/JP89/01263
§ 371 Date: Aug. 13, 1990
§ 102(e) Date: Aug. 13, 1990

[30] Foreign Application Priority Data

Dec. 20, 1988 [JP] Japan ................. 63-321601

[51] Int. Cl.⁵ .................... G11B 7/00; G11B 7/24
[52] U.S. Cl. .................. 369/48; 369/275.3; 235/454; 235/494
[58] Field of Search ........... 235/454, 487, 494, 456, 235/492; 369/47, 48, 44.38, 44.39, 275.1, 275.3, 275.4, 44.26

[56] References Cited

U.S. PATENT DOCUMENTS

| | | | |
|---|---|---|---|
| 4,787,075 | 11/1988 | Matsuoka et al. | 369/44.38 |
| 4,982,075 | 1/1991 | Aoki et al. | 235/456 |
| 4,982,391 | 1/1991 | Sakagami et al. | 369/58 |
| 4,985,616 | 1/1991 | Nakamura et al. | 235/454 |
| 4,998,009 | 3/1991 | Iijima et al. | 369/58 |

FOREIGN PATENT DOCUMENTS

| | | | |
|---|---|---|---|
| 0242078 | 10/1987 | European Pat. Off. | 369/275.3 |
| 61-242373 | 10/1986 | Japan | |
| 0079953 | 3/1989 | Japan | 369/44.39 |

Primary Examiner—Roy N. Envall, Jr.
Assistant Examiner—Thang V. Tran
Attorney, Agent, or Firm—Lackenbach Siegel Marzullo & Aronson

[57] ABSTRACT

The invention relates to an optical recording medium having a plurality of guide lines (1) and data regions (5) which are defined between adjacent guide lines and in which data is optically recorded. Each guide line (1) includes a start guide (2) indicating the leading end of the data region, clock guides (3) arranged at a predetermined interval to follow the start guide (2) and enabling synchronization during reading and writing, and sector marks (4) arranged at a predetermined interval so as to divide the data region (5) into a plurality of sectors. The clock guides (3) on adjacent guide lines are arranged in such a staggered manner that the clock guides (3) appear alternatingly in both guide lines. The data region having sector number writing portion (5a) provided in the vicinity of each sector mark (4) for writing a sector identification number to be written therein. This arrangement enables an easy recognition of a shift to the next data bit or to the next data bit writing position during reading and writing of the data. At the same time, the sector mark (4) improves the efficiency of the recording region.

3 Claims, 3 Drawing Sheets

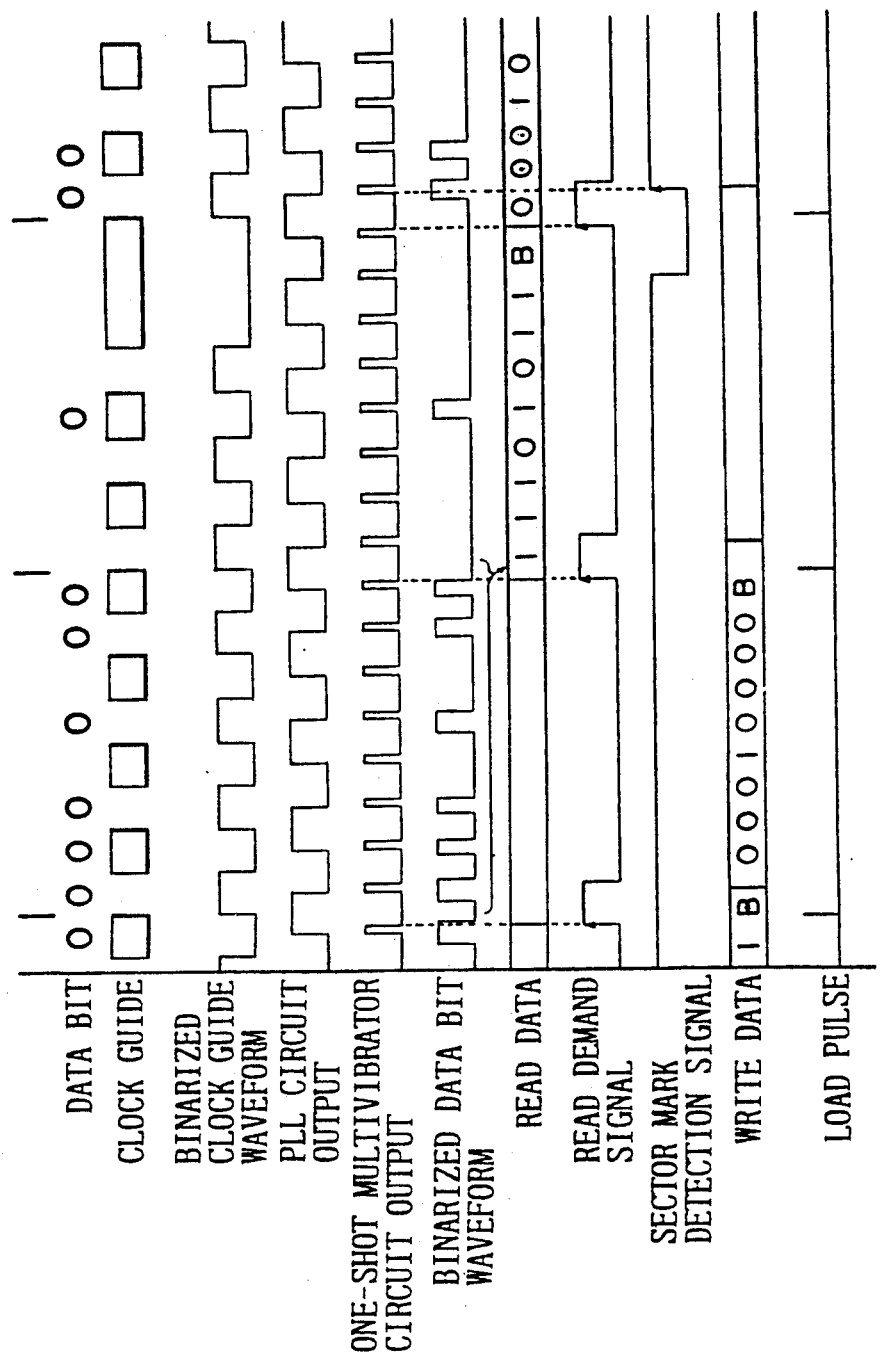

OPTICAL RECORDING MEDIUM AND DEVICE FOR WRITING AND READING INFORMATION IN AND FROM THE RECORDING MEDIUM

BACKGROUND OF THE INVENTION

1. Technical Field

The present invention relates to an optical recording medium having a plurality of guide lines and data regions which are defined between adjacent guide lines and usable for optically recording data therein.

2. Background Art

Hitherto, an optical recording medium of this kind has linear track guides and data regions.

Reading and writing of data are accomplished by a self-clock method in which synchronization is achieved by means of clock bits contained in the data, while tracking is conducted to follow up a track guide.

The conventional optical recording medium, however, suffers from the following problems due to the use of the self-lock method. Namely, once the lock of the tracking is broken due to, for example, a contaminant or flaw in the surface of the optical recording medium, reading of data fails until the next clock bit is read. In addition, erroneous reading of data tends to result after a relocking, due to the fact that there is no means for identifying the leading end of the data.

SUMMARY OF THE INVENTION

In order to overcome the above-described problems of the know art, according to the present invention, there is provided an optical recording medium having a plurality of guide lines and data regions which are defined between adjacent guide lines and in which data is optically recorded, wherein each guide line includes a start guide indicating the leading end of the data region, clock guides arranged at a predetermined interval to follow the start guide and enabling synchronization during reading and writing, and sector marks arranged at a predetermined interval so as to divide the data region into a plurality of sectors, the clock guides on adjacent guide lines being arranged in such a staggered manner that the clock guides appear alternately in both guide lines, the data region having sector number writing portions provided in the vicinity of each sector mark for writing a sector identification number to be written therein.

According to the invention, since clock guides are provided on guide lines such that clock guides on two adjacent guide lines appear alternately, it is possible to easily recognize that the head has been moved to the next data bit during reading or to the next data bit writing position during writing.

According to the invention, each track as the data region is sectioned into a plurality of sectors at a constant interval, and sector marks indicating the border between the adjacent sectors are provided on the guide line. Thus, each track is divided into a plurality of sectors. In the known recording mediums, one full track becomes unusable when a flaw or a contaminant resides on the track. In contrast, according to the invention, only the sector of a track which has a contaminant or a flaw becomes unusable, and other sectors of the same track still remain usable, whereby the efficiency of the recording region is improved.

In addition, since identification number of each sector is written in the data regions subsequent to the guide line, it becomes possible to definitely recognize and identify the sector. It is therefore possible to promptly recognize the position of the sector when the tracking is locked again after accidental unlocking due to presence of a flaw or contaminant on the surface of the optical recording medium.

In a preferred form of the present invention, the sector mark has a length which is n times as large the length of the clock guide, where n is an integer. This eliminates the necessity for synchronization because there is no offset of the timing between the binarized signal of the clock guide and the output signal from the PLL circuit.

According to another aspect of the present invention, there is provided an apparatus for reading and writing data from and in the optical recording medium, comprising: a clock guide reading section for reading the guide line and attaining synchronism by using the read clock guides; data reading section for reading data using, as references, the synchronizing signals derived from the clock guide reading section; and a writing section for writing data in the optical medium by using, as references, synchronizing signals from the data reading section; wherein the clock guide reading section includes a binarizing circuit for binarizing the clock guide read waveform, a PLL circuit for effecting a 90° phase shift of the output from the binarizing circuit, one-shot multivibrator circuits for producing synchronizing signals in response to edges of the output signal from the PLL circuit, and a flip-flop circuit for detecting the sector mark from the outputs of the binarizing circuit and the PLL circuit.

Since the data bit needs to be written in the center of the clock guide, the risk for erroneous reading of data is eliminated despite any fluctuation in the position and size of the data bit. In addition, the efficiency of recording of the data is improved because the synchronizing signals are delivered in response rises and falls of the output signal from the PLL circuit.

BRIEF DESCRIPTION OF THE DRAWINGS

FIG. 4 is a time chart illustrating the operation of the apparatus shown in FIG. 3 for reading data from the optical recording medium shown in FIG. 1.

THE BEST MODE FOR CARRYING OUT THE INVENTION

Figure 1:
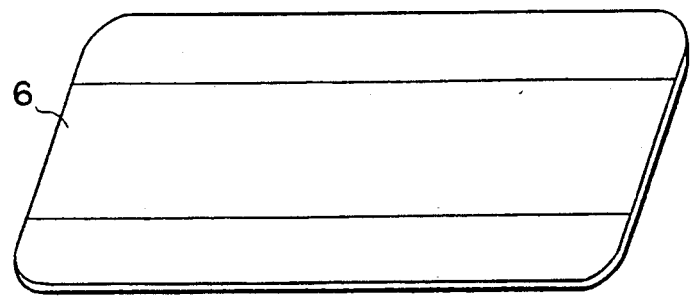
FIG. 1 is a perspective view of an embodiment of optical recording medium of the present invention.

An optical recording medium of this embodiment has a recording region 6 as shown in FIG. 1. The optical recording medium, however, need not always be of the card type shown in FIG. 1 but may be of other types such as disk type.

Figure 2:
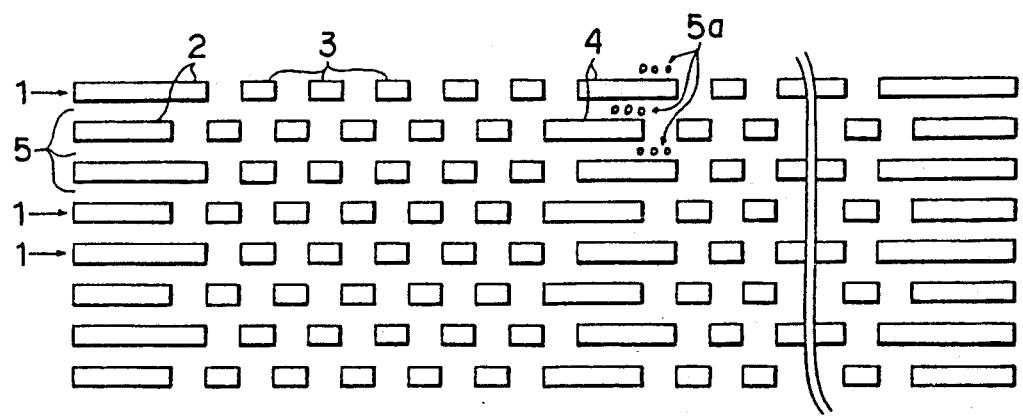
FIG. 2 is an enlarged view of an essential portion of the embodiment shown in FIG. 1.
Figure 3:
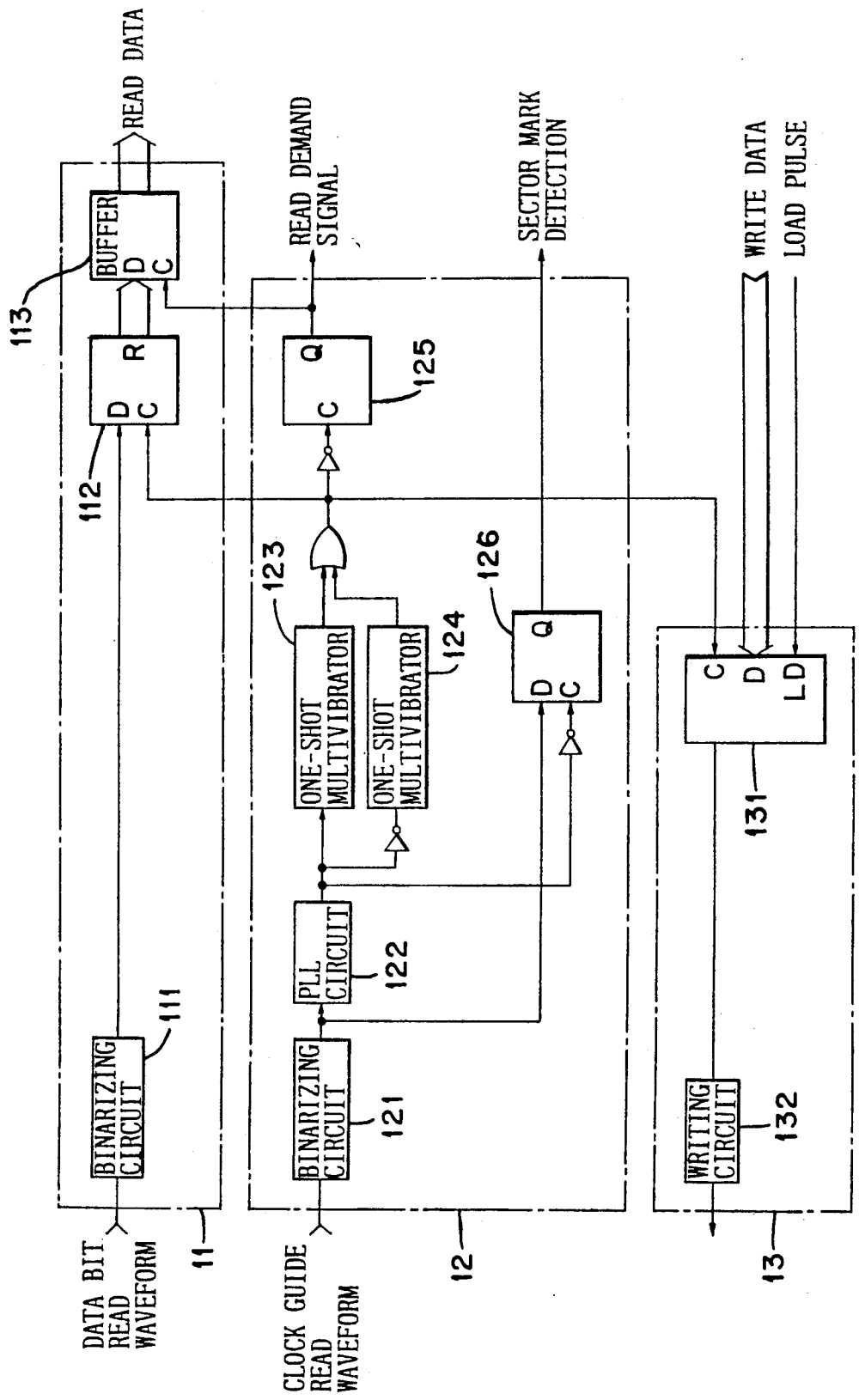
FIG. 3 is a block diagram of data reading and writing apparatus which makes use of the optical recording medium shown in FIG. 1.

FIG. 2 is an enlarged view of the recording region 6. The recording region 6 has a plurality of guide lines 1 and data regions 5 between adjacent guide lines 1. The data regions 5 are the regions in which data are optically recorded.

Each guide line 1 is composed of a start guide 2, clock guides 3 and a sector mark 4, and serves as a tracking guide used during reading and writing data.

The start guide 2 is provided on the end of the guide line 1 and indicates the position of the leading end of the data region 5. The clock guides 3 have a predetermined width and are regularly arranged at a constant interval following the start guide 2. These clock guides 3 are used for obtaining synchronization during reading and writing. The clock guides 3 on two adjacent guide lines 1 are arranged in a staggered manner such that the clock guides on both guide lines appear alternately, thereby making it possible to recognize any shift of the data bit during reading and writing of data. The sector mark 4 has a length which is equal to the total length of a plurality of clock guides, i.e., a length which is obtained by multiplying the length of the clock guide 3 with an integer. The sector marks 4 are provided on the guide line 1 at a predetermined interval, thus defining each sector of the guide line. In other words, each track is divided into a plurality of sectors by these sector marks. In the event that one of the sectors of a track is defective due to presence of a flaw or contamination, only the defective sector becomes unusable while other sectors remain usable.

Data are written in the data region 5 using the clock guides 3 as the time reference. A sector number writing portion 5a is provided in the data region 5 near the sector mark 4. A bit representing the address of each sector is written in the sector number writing portion 5a, thereby enabling a clear identification of the sector position.

A description will be now given of an embodiment of the apparatus of the invention for writing and reading data in and from the optical recording medium described hereinbefore.

The apparatus has a data reading section 11, a clock guide reading section 12 and a writing section 13.

The clock guide reading section 12 includes a binarizing circuit 121 for binarizing the reading output obtained by reading the clock guides 3, a PLL circuit 122 for effecting a 90° phase shift of the output from the binarizing circuit 121, one-shot multivibrator circuits 123, 124 which produce pulses in response to rise and fall of the output of the PLL circuit 122, and a counter which counts the falls of the pulses from the one-shot multivibrator circuits 123, 124 and capable of producing a read demand signal when the count has reached a predetermined number. The apparatus also has a flip-flop circuit 126 which detects the sector mark 4 from the output of the binarizing circuit 121 and a signal obtained by inverting the output from the PLL circuit 122.

The data reading section 11 includes a binarizing circuit 111 for binarizing the data reading output waveform, a serial-parallel conversion circuit 112 for conducting serial-parallel conversion of the output of the binarizing circuit 111 in accordance with the outputs of the one-shop multivibrator circuits 123, 124, and a buffer circuit for receiving the output of the serial-parallel conversion circuit 112 in accordance with the read demand signal of the counter 125.

The writing section 13 includes a parallel-serial conversion circuit 131 for conducting parallel-serial conversion of the write data in accordance with the outputs from the one-shot multivibrator circuits 123, 124 and a load pulse transmitted from the CPU, and a writing circuit 132 for writing the output of the parallel-serial conversion circuit 131 in the data region 5 of the optical recording medium.

The operation of this apparatus for reading and writing data from and in the optical recording medium shown in FIGS. 1 and 2 will be described with reference to a time chart shown in FIG. 4.

Since the output from the binarizing circuit 121 is shifted 90° by the PLL circuit 122, the output of the PLL circuit 122 rises or falls at the midst of each clock guide 3. The one-shot multivibrator circuits 123 and 124 produce pulses which rise simultaneously with the rise and fall of the output from the PLL circuit 122.

The data binarized by the binarizing circuit 111 is serial-parallel converted. Detection of the converted data is conducted by using the rising pulses output from the one-shot multivibrator circuits 123, 124 as the triggers. Namely, "1" is output when data exists in the midst of the clock guide, whereas, when no data exists, "0" is obtained as the data detection output.

The falls of the output pulses from the one-shot multivibrator circuits 123, 124 are counted by the counter 125 and, when the count value has reached a predetermined value, the counter 125 outputs a reading demand.

In response to reading of the sector mark 4, the flip-flop circuit 126 delivers a sector mark detection signal, in response to the output from the binarizing circuit 121 and the signal obtained by inverting the output of the PLL circuit 122. Reading of data is conducted on a recognition that the sector mark detection signal indicates the leading end of the sector containing the data to be read.

The writing of data is conducted as follows. The parallel write data derived from the CPU is converted into serial signals and the writing circuit 132 writes the serial signals in the recording medium using the rising pulses output from the one-shot multivibrators 123, 124 as the triggers. Consequently, the data is written in positions between the clock guides 3.

The load pulse is transmitted from the CPU after detection of the rising edge of the read demand signal.

What is claimed is:

1. An optical recording medium having a plurality of guide lines and data regions which are defined between adjacent guide lines and in which data is optically recorded, wherein each said guide line includes a start guide indicating the leading end of an associated data region, a plurality of clock guides arranged at a predetermined interval to follow said start guide and enabling a synchronization during reading and writing, and sector marks arranged at a predetermined interval so as to divide said guide line into a plurality of sectors, said clock guides on adjacent guide lines being arranged in such a staggered manner that said clock guides appear alternately in both guide lines, said data region having section number writing portion provided in the vicinity of each sector mark for writing a sector identification number to be written therein.

2. An optical recording medium according to claim 1, wherein said sector mark has a length equal to length obtained by multiplying the length of a clock guide with an integer.

3. An apparatus for reading and writing optical data from and to an optical recording medium comprising a plurality of guide lines and data regions which are defined between adjacent guide lines and in which data is optically recorded, wherein each said guide line includes a start guide indicating the leading end of said data region, clock guides arranged at a predetermined interval to follow said start guide and enabling synchronization during reading and writing, and sector marks arranged at a predetermined interval so as to divide said guide line into a plurality of sectors, said clock guides on adjacent guide lines being arranged in such a staggered manner that said clock guides appear alternately in both guide lines, said data region having a sector number writing portion provided in the vicinity of each sector mark for writing a sector identification number to be written therein, comprising:

a clock guide reading section for reading said guide line and attaining synchronism by using the read clock guides; data reading section for reading data using, as references, the synchronizing signals derived from said clock guide reading section; and a writing section for writing data in said optical medium by using, as references, synchronizing signals from said data reading section;

wherein said clock guide reading section includes a binarizing circuit for binarizing the clock guide read waveform, a PLL circuit for effecting a 90 degree phase shift of the output from said binarizing circuit, one-shot multivibrator circuits for producing synchronizing signals in response to edges of the output signal from said PLL circuit, and a flip-flop circuit for detecting the sector mark from the outputs of said binarizing circuit and said PLL circuit.

* * * * *